Aug. 25, 1925.

S. P. F. SNEED

1,550,753

FLEXIBLE COUPLING

Filed Dec. 14, 1921    4 Sheets-Sheet 1

Inventor
Stephen P. F. Sneed
William G. Henderson
Attorney

Aug. 25, 1925.   S. P. F. SNEED   1,550,753
FLEXIBLE COUPLING
Filed Dec. 14, 1921   4 Sheets—Sheet 4

Patented Aug. 25, 1925.

1,550,753

UNITED STATES PATENT OFFICE.

STEPHEN P. F. SNEED, OF HARTFORD, CONNECTICUT.

FLEXIBLE COUPLING.

Application filed December 14, 1921. Serial No. 522,428.

*To all whom it may concern:*

Be it known that I, STEPHEN P. F. SNEED, a citizen of the United States, residing at Hartford, in the county of Hartford and State of Connecticut, have invented certain new and useful Improvements in Flexible Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Under many circumstances, such for example, as the driving of motor cars, it is desirable to apply the driving force to accelerate the mass of the vehicle or the like through a frictional clutch; but such arrangements are attended by the disadvantage that the coefficient of friction of such clutches increases suddenly and greatly as the relative speed of the contact surfaces decreases, and as a consequence the acceleration is accompanied by strains, power losses, inefficiencies and damage to the mechanism. This is illustrated in an extreme case where in starting a heavy motor vehicle out of a difficult place, too abrupt application of the driving force through a friction clutch will ordinarily have the effect either to stall the engine or to cause the rear wheels to lose their traction grip and slip, before the inertia of the vehicle can be overcome. From this illustration the lesser difficulties in the less extreme cases such as ordinary acceleration strains, gear shifting strains, braking strains, etc., will be understood.

For these reasons it has frequently been proposed to insert in the drive shaft of a motor vehicle or any machinery subject to tortional shocks, a suitable cushioning device capable of absorbing such shocks incident to changing from a state of rest to a state of motion, or from one speed to another, but so far as I am aware such devices have not gone into general use.

It is the purpose of the present invention to provide such a device which is of simple and rugged construction, of reasonable manufacturing cost, and generally capable of withstanding the strains and wear, and of otherwise satisfying the exacting conditions with respect to durability, ease of repair, and so on, which must be met in motor vehicle construction.

To this end there is inserted in the driving shaft a simple hydraulic buffer comprising a liquid-containing cylinder and suitably packed compression piston, with a by-pass for the liquid containing a restricted orifice, so that the shocks incident to the acceleration will be absorbed to a sufficient degree in the hydraulic buffer; and, although such an arrangement may in certain cases be applied without further complication to the intended purpose, I have preferred for general use in motor cars to supplement the action of the hydraulic buffer by providing resilient means such as a compression spring so arranged as to limit the compression movement of the piston and to effect the return movement of the piston when the accelerating force is withdrawn.

In order that the principles of my invention may be more clearly understood, and for the purpose of disclosing certain improved features of construction which I have devised, I have illustrated in the accompanying drawings and will now describe certain preferred embodiments of the invention. In this illustration and description I have not attempted to indicate possible variations of construction, beyond those specifically illustrated and described, but have defined the scope of the invention in the appended claims.

Fig. 2$^a$ is a fragmentary longitudinal section through a part of the device shown in Fig. 2.

Fig. 2$^b$ is a fragmentary longitudinal section through a part of the device, the sleeve being shown in cross-section.

Fig. 2$^c$ is a transverse section through the device shown in Figs. 2, 2$^a$ and 2$^b$.

Figs. 3ª, 3ᵇ and 3ᶜ are detail views of the split sleeve or nut embodied in the construction of Fig. 3.

Figure 1:
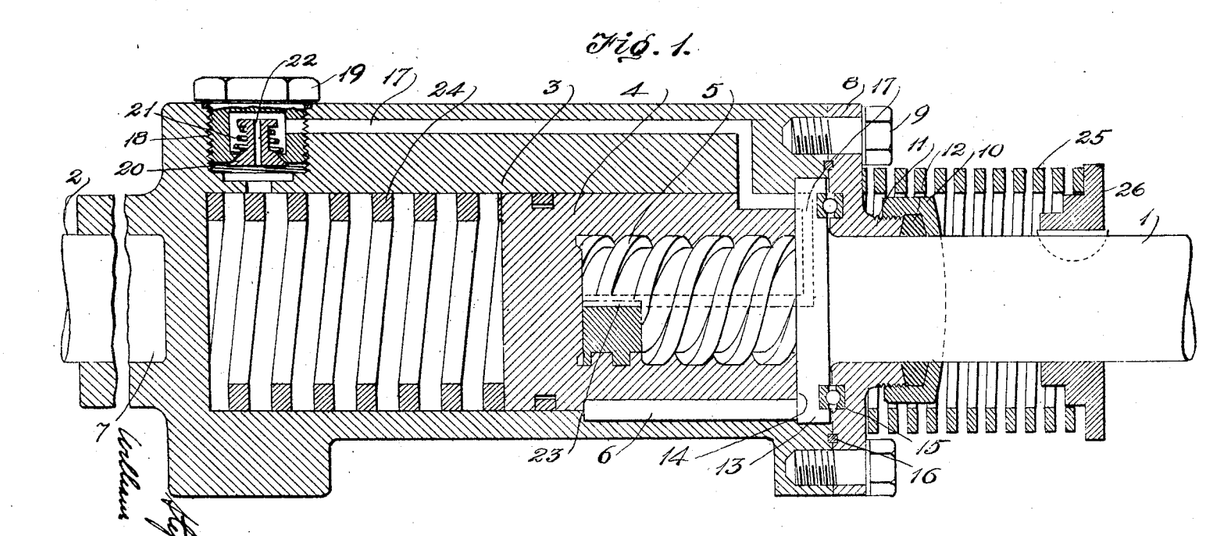
Fig. 1 is a vertical longitudinal section of so much of a shafting as necessary to illustrate an embodiment of the invention.

In the drawing the numeral 1 designates one section of a shaft and 2 the other section, of which one may be the drive-end section and the other the driven-end section, and for convenience of illustration and description the section 1 will be regarded as the drive section and 2 as the driven end. Between the two sections of shaft there is an hydraulic buffer comprising a housing or cylinder 3 within which is a compression piston 4 having the usual packing ring and provided with interior female screw threads to receive the male screw threads 5 formed on the end of the rotating shaft section 1 by which the piston is moved axially within the housing or cylinder, the piston being connected by one or more keys or splines 6 for the purpose of transmitting to the cylinder the driving torque while permitting the piston to move longitudinally on its compression and return strokes. One distinct advantage of the present invention lies in the fact that the compression piston 4 has a closed head; i. e. the screw threads do not extend entirely through the piston. It should also be noted that the piston is not provided with screw threads on the outside thereof. The outside of the piston is smooth and can be carefully machined to fit the cylinder 3 so that there will be no leakage of oil such as would occur if these parts engaged each other by means of a screw threaded connection. If screw threads were provided, either on the outside of the piston 4, or extending through the center of this piston, there would be considerable oil leakage along the threads. The most serious disadvantage of such a construction lies in the fact that the leakage would not necessarily be the same in any two buffers, for the screw threaded parts cannot be made to fit in exactly the same manner. If this leakage of oil were an uncertain quantity, it would not be possible to design a buffer so as to give satisfactory results in commercial practice. It is not necessary to machine carefully the screw threads 5; in fact these screw threads may be practically as rough as jack-screw threads, thus simplifying the manufacturing operation. If the screw threaded member extended entirely through the piston 4, it would be necessary to machine the screw threads accurately, and even then the uncertainty regarding the amount of leakage along the threads would be objectionable.

One head of the cylinder 3 is made integral therewith and has a socket 7 to receive and have splined thereto one section 2 of the transmission shaft. The other head 8 of the cylinder is secured by machine bolts or screws 9, and through this head passes the shaft section 1, and a collar or cap 10 is screwed onto a boss or neck 11 of the head, with a packing 12 between, making packed joint between the shaft, head and screw cap. The shaft 1 has a flange or collar 13, preferably made integral therewith, fitting within a recess 14 made in the end of the cylinder 3 and having the head 8 bearing against one face so that axial movement of the shaft is prevented. A bearing 15 is fitted between the head 8 and collar 13, and another packing 16 between the head and end of the cylinder. Since the compression end of the cylinder 3 is integral with the cylinder, and the packings 12 and 16 are provided at the opposite end of the cylinder 3, in locations remote from the oil passage 17, in which the oil pressure is always low, there is no opportunity for the oil to escape past the packing rings. This construction produces a very desirable result in that it avoids the disadvantages and insurmountable difficulties involved when an attempt is made to prevent oil under considerable pressure from passing along a shaft. The hydraulic buffers heretofore proposed have been constructed in such a manner that the full liquid pressure was applied to a shaft packing. Experience has shown that packing arranged in this manner cannot prevent the escape of oil unless it is so tight that the shaft cannot rotate. Since, of course, the shaft must rotate, the liquid would leak appreciably through the packing and this would be entirely unsatisfactory for use on motor vehicles, on account of the necessary refilling required and the unsatisfactory operation of the device whenever any appreciable amount of the liquid escapes. My improved buffer is constructed in such a manner that the oil under pressure does not come in contact with any packing, even though the device operates in both directions of shaft rotation. The oil under pressure is confined between the solid piston head and the closed end of the cylinder 3. The importance of this feature is evident upon considering the fact that it is necessary to use relatively light oil, such as hydroline, for heavy oils tend to thicken or congeal at low temperature.

A duct of passage-way 17 effects communication between the two ends of the piston cylinder, at opposite ends of the piston, the duct being provided with a suitable valve having a restricted orifice for limiting the flow of a liquid from the cylinder on the compression stroke and for freely opening the duct on the return stroke. This valve in the form illustrated consists of a valve-seat 18 formed in a plug 19 screwed into the cylinder at one end and a valve 20 held to the seat by a spring 21 and having a restricted opening 22 permitting a restricted flow of a cushioning liquid, such as hydroline or "gun oil," or other suitable oil, from one end of the cylinder through the duct 17 to the other under movement of the piston on the compression stroke, and a freer flow of the oil in the movement of the piston on the return stroke. The reaction produced by the restricted opening 22 is proportional to the square of the velocity of the piston 4 and inversely proportional to the square of the area of the orifice.

Oil forced through duct 17 is discharged into the space which opens up about the base of the piston when the piston moves forward or away from the collar 13. The notch 17' out of the base of the piston adjacent to the end of the duct 17 permits free flow of the oil at the beginning of the action.

The screw threaded portion of shaft 1 has a central bore 23 extending through collar 13 which conducts oil from the space which opens up about the base of the piston (described above) and discharges it into the piston next to its head at the end of the threaded shaft, and thus the amount of oil displaced from the piston cylinder is received behind the piston and inside it under its head. The volume displaced by the piston in moving being constantly equal to the space which it opens up as described. On the return piston stroke this volume of oil is returned to the cylinder.

Within the piston cylinder between one end and the piston is a coil spring 24 which is compressed on the compression or expulsion stroke of the piston so that this spring in conjunction with the liquid placed under compression by the piston coact together to form a most effective cushion in absorbing the shock incident to coupling one shaft to another by throwing in a clutch, or otherwise, in changing speed or starting rotation of a shaft, applying brakes or accelerating. A coil spring 25 encircles shaft 1 and is connected at one end to the head 8 of the rotatable housing or cylinder 3 and at the other end to a collar 26 keyed to the shaft 1 so that in rotation of the shaft in one direction, say in the direction to move piston 4 forward in the cylinder 3, the torsional power of the spring will be overcome and it will remain under tension until the rotary force is relieved from the shaft at which time it assists in returning the mechanism to the neutral or ready position, aided by the recoil or expansion of spring 24 acting on the head of the piston. Either spring 24 or 25 may be used independently of the other. The spring tension will preferably be such as to hold the action partly open under normal driving strains, i. e. holding part of the cushioning action available for excess torques.

The cushioning action or thrust of the device will come to rest when the thrust force of the piston caused by the shaft rotation and screw action is balanced by the thrust of spring 24 together with the attendant frictional resistance. The sudden excessive strains of starting i. e. (quickly overcoming inertia) are resisted principally by the oil pressure which increases proportionately to the force applied.

This invention makes it unnecessary to shift gears under normal conditions of starting and stopping a motor vehicle. It is possible to start the vehicle smoothly in high gear by simply engaging a clutch. This desirable effect is produced by the buffer operating in one direction only; i. e. it can be performed by the type of buffer above described.

Figure 2:
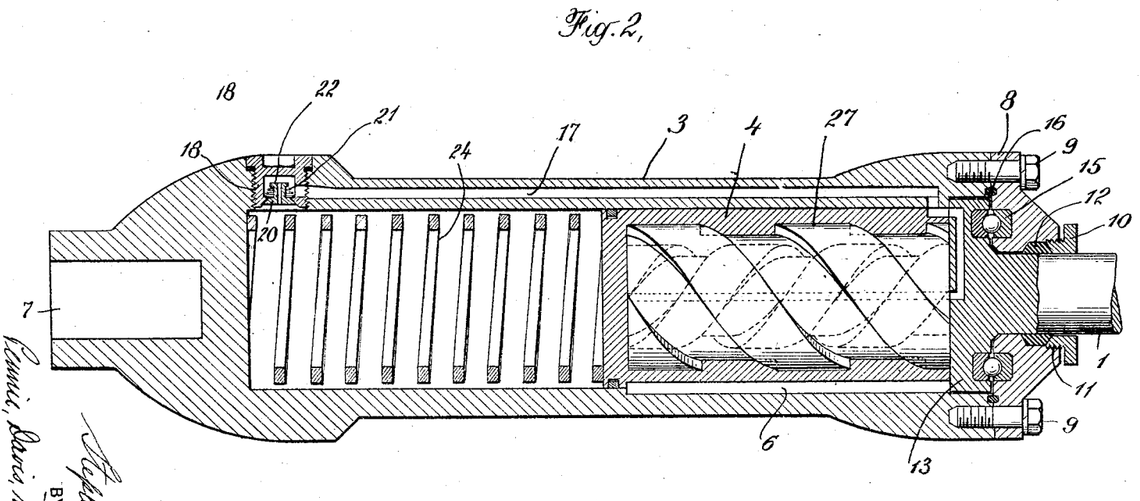
Fig. 2 is a vertical longitudinal section through the device, illustrating a combination of screws which if substituted for the screw shown in Fig. 1 will cause the mechanism to function when the shafting is rotated in either direction.
Figure 2A:
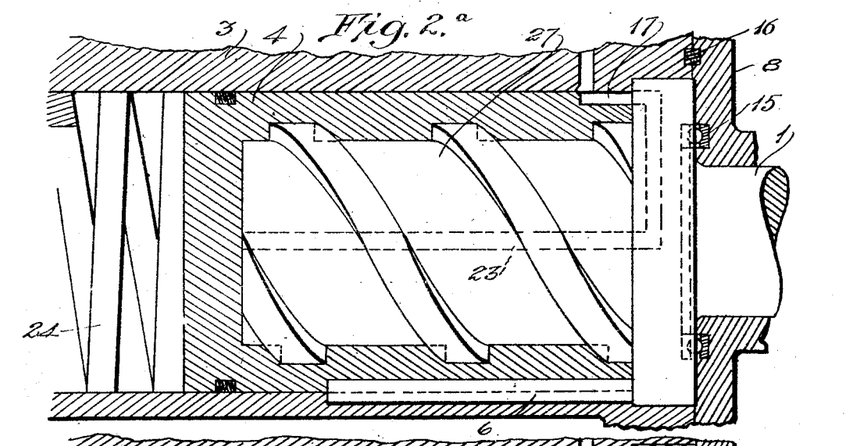
Figures 2B, 2C:
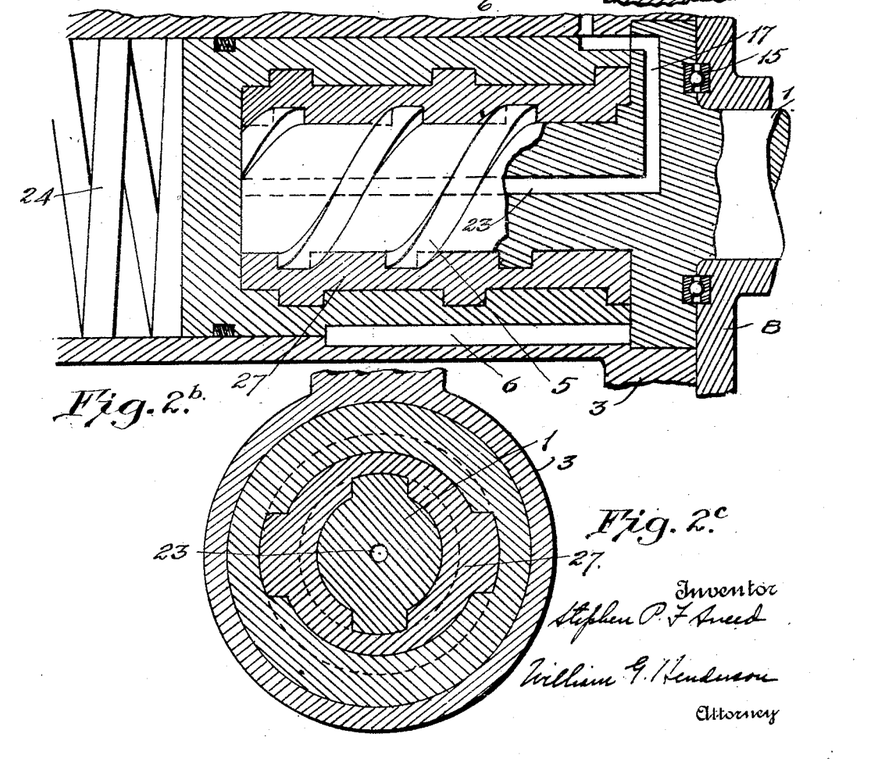

In Figs. 2, 2$^a$, 2$^b$ and 2$^c$ of the drawing is illustrated a form of the invention in which the same results are obtained whether the shaft be rotated to the right or to the left.

A compound screw is provided which will push the piston forward into the cylinder whether the shaft be rotated to the left or to the right.

All the component parts of the mechanism illustrated in Fig. 2 are the same as parts in Fig. 1 and are to be applied to or embodied in a mechanism as Fig. 1 (and are therefore not illustrated in duplicate) with the exception and addition of the cuff or cylinder 27 carrying male threads on its outside surface (engaging in corresponding threads on the inside surface of the piston) and female threads on its inside surface (engaging in threads 5 on shaft 1). This threaded cylinder is not attached or fastened to any other part.

When the rotation of the shaft is right-handed the cuff locks with the piston as its right-handed rotation is stopped by butting against the piston head and the piston and cuff move forward together as a unit actuated by threads 5 on shaft 1. The piston is held by splines 6 running in grooves and cannot rotate.

Its return to neutral or ready position is accomplished by the pressure of the springs when the torque is removed as already described.

When the rotation of the shaft is left-handed the cuff locks with the shaft 1 and threads 5, as left-hand rotation of threads 5 in the cuff is stopped by the collar and flange 13 butting together and shaft 1, threads 5 and cuff and its threads 27 all rotate to the left as a unit forcing the piston alone forward in the cylinder.

The return to neutral or ready position is accomplished by one or both of the springs as before described. In this form the pitch or angle of slope of the screw threads will be greater than in the mechanism as illustrated in Fig. 1 and it is possible to entirely dispose of the outside spring 25 in either case if the screw thread pitches are sufficiently increased so that spring 24 will return the mechanism to neutral or ready position.

I have found that for automotive work it is generally not feasible to employ a turn or twist of the buffer greater than one complete revolution. In fact, a torque buffer operating through only ⅜ of a turn has been found to give very satisfactory results on a medium weight vehicle. The action of the transmission gears imposes a practical limitation on the number of turns which can be employed to advantage. For proper gear shifting, the transmission gears must be made to rotate, for an instant, at the same speed. When the torque resisted by the buffer is removed, the buffer begins to "unwind." That is, just as one set of gears is unmeshed to change and engage the next set of gears, the gears attached to the drive shaft and buffer are given a twist. If the buffer takes much more than one complete turn, the time required for the unwinding operation is so long that the gears cannot be shifted readily; but if the unwinding is effected quickly, as when the buffer takes only a single turn or even less, the buffer has the effect of a clutch brake, and this action is very desirable.

I have found that very satisfactory results can be obtained by using a mean effective screw pitch of approximately 37°; the angular slope of the threads, of course, varying from the circumference toward the cylinder axis for any given pitch.

To apply tortional helical spring 25 to a reversible rotary mechanism either two separate springs must be used or the common arrangement used on door stops to flex a spring must be used. This arrangement pulls one end of the spring for one rotation and vice versa so as always to coil the spring toward a smaller diameter.

Figure 3:
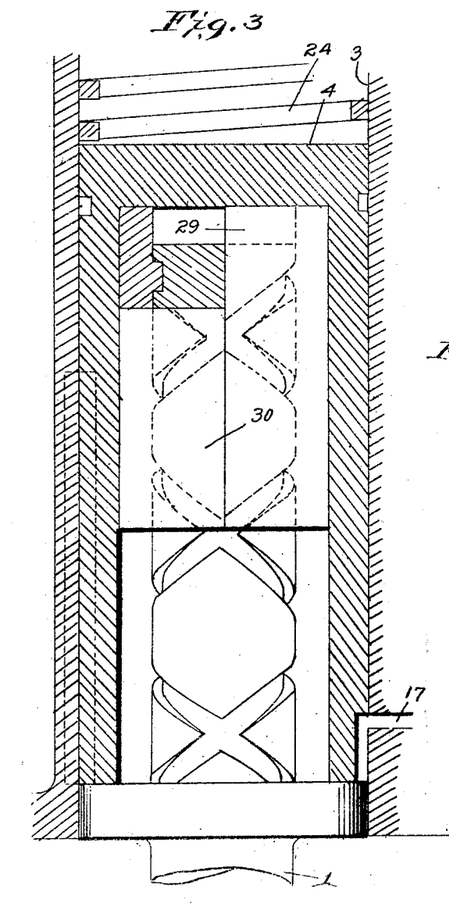
Fig. 3 is a vertical longitudinal section through a part of the device, illustrating a combination of right and left-handed screw threads on one shaft and two half nuts one with right-handed threads and one with left-handed threads which, if substituted for the screw shown in Fig. 1 will cause the mechanism to function when the shafting is rotated in either direction.
Figure 3A:
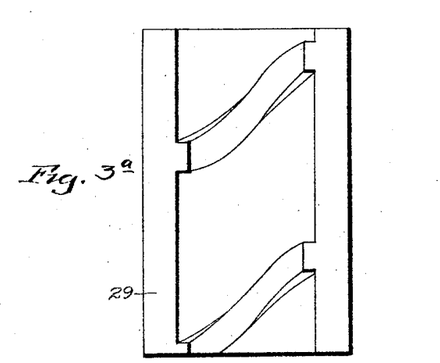
Figure 3B:
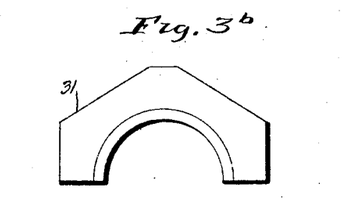
Figure 3C:
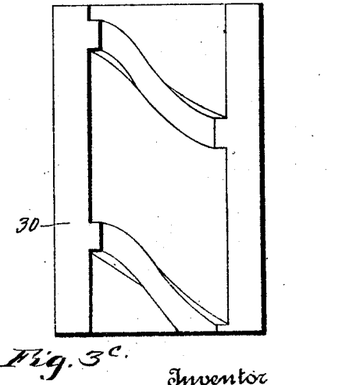

In Fig. 3 of the drawing is illustrated an additional alternative form of the invention in which the same results are obtained whether the shaft be rotated to the right or to the left.

All the component parts of the mechanism illustrated in Fig. 3 are the same as parts in Fig. 1 and are to be applied to or embodied in a mechanism as Fig. 1 (and are therefore not illustrated in duplicate).

Shaft 1 where it extends into the piston has right-handed and left-handed threads cut into it as grooves. There are two half sections of nuts 29 and 30 bearing against this shaft and moving along it, their back edges 31 fitting hexagonal slots cut inside the cylinder. The nut section 29 carries left-handed inside threads engaging in the left-handed threads of shaft 1 and the half section of the nut 30 carries right-hand threads which engage in the right-handed threads of shaft 1.

It is apparent that if the shaft is rotated in either direction one half section of nut will move forward pushing the piston with it, the other will move back passing into the open space provided to receive it and vice versa.

The fact that these nut sections acting on the piston do not push on its direct center is of no importance as the piston fits snugly in the cylinder and cannot be turned out of alinement. Either or both springs as 24 and 25 are applicable to returning this device to normal or ready position.

It will be observed that with the arrangement of my invention the hydraulic buffer limits in the first instant the torque applied through the driving connections from the driving source to the element to be driven. This torque cannot exceed the resistance to the forward movement of the piston, which is made up of the resistance to the flow of the cushioning liquid through the restricted orifice plus the resistance of the spring 24, plus the spring 25. The movement of the piston will stop when the sum of these forces balances the torque, which may, and preferably will occur under ordinary conditions, before the spring is completely compressed thereby leaving the possibility of further movement to take care of sudden torque impulses. The arrangement has the advantage of simplicity and ruggedness of construction, the packing ring of the piston and the valve confine the oil under pressure to the space between the piston and the cylinder head thereby eliminating the necessity of packing the other portions of the device against high pressure, the parts do not have to be accurately machined excepting the valve seat, it is possible to use a light oil such as hydroline which is not subject to changes in viscosity with temperature as heavy oils are, and considerable latitude of movement is permitted so that one or more complete revolutions of the driving shaft relative to the driven shaft are possible within the range of operation of the device.

It is to be understood that the various details of this invention may be modified without departing from the spirit of the invention, which is not limited to the particular embodiments shown and described, but is intended to include such modifications thereof as fall within the scope of the appended claims. For example, while I prefer to use the restricted by-pass shown in the drawings and described above, yet this invention may be employed to advantage by using any other suitable by-pass, such as the common spline orifice which may be extended the full length of the piston stroke and which may be tapered so that the orifice tapers toward the end of the stroke.

I claim:

1. A drive-shaft for automobiles and the like having interposed therein an hydraulic buffer comprising a smooth bored cylinder containing a cushioning liquid, a piston with suitable packing movable within the cylinder, a by-pass for the liquid having a restricted orifice, a torque-transmitting connection between the piston and cylinder which prevents relative rotation of these parts, and a connection between one element of the drive-shaft and the piston to impart a compression movement to the piston upon application of an accelerating force to the drive-shaft.

2. A drive-shaft for automobiles and the like having interposed therein an hydraulic buffer comprising a cylinder containing a cushioning liquid, a piston with suitable packing movable within the cylinder, a by-pass for the liquid having a restricted orifice operative throughout the compression movement of the piston and a free passage on the return movement thereof, a torque-transmitting connection between the piston and cylinder, a connection between one element of the drive-shaft and the piston to impart a compression movement to the piston upon application of an accelerating force to the drive-shaft, and means for imparting a return movement to the piston when the accelerating force is withdrawn.

3. A drive-shaft for automobiles and the like having interposed therein an hydraulic buffer comprising a cylinder containing a cushioning liquid, a piston with suitable packing movable within the cylinder, a by-pass for the liquid having a restricted orifice operative on the compression movement of the piston and a free passage on the return movement thereof, a torque-transmitting connection between the piston and cylinder, a connection between one element of the drive-shaft and the piston to impart a compression movement to the piston upon application of an accelerating force to the drive-shaft, and resilient means or limiting the compression movement of the piston and for imparting to it a return movement when the accelerating force is withdrawn.

4. A drive-shaft for automobiles and the like having interposed therein an hydraulic buffer comprising a cylinder containing a cushioning liquid, a piston with suitable packing movable within the cylinder, a by-pass for the liquid having a restricted orifice, a torque-transmitting connection between the piston and cylinder, a connection between one element of the drive-shaft and the piston to impart a compression movement to the piston upon application of an accelerating force to the drive-shaft, and means for imparting a return movement to the piston when the accelerating force is withdrawn.

5. A drive-shaft for automobiles and the like having interposed therein an hydraulic buffer comprising a cylinder containing a cushioning liquid, a piston with suitable packing movable within the cylinder, a by-pass for the liquid having a restricted orifice, a torque-transmitting connection between the piston and cylinder, and a connection between one element of the drive-shaft and the piston for imparting a compression movement thereto upon application of an accelerating force to the drive-shaft in either direction of rotation.

6. A drive-shaft for automobiles and the like having interposed therein an hydraulic buffer comprising a cylinder containing a cushioning liquid, a piston with suitable packing movable within the cylinder, a by-pass for the liquid having a restricted orifice, a torque-transmitting connection between the piston and cylinder, and a compound screw connection between one element of the drive-shaft and the piston for imparting a compression movement thereto upon application of an accelerating force to the drive-shaft in either direction of rotation.

7. A drive-shaft for automobiles and the like having interposed therein an hydraulic buffer comprising a cylinder containing a cushioning liquid, a piston with suitable packing movable within the cylinder, a by-pass for the liquid having a restricted orifice, a torque-transmitting connection between the piston and cylinder, and a compound screw with a split engaging sleeve constituting a connection between one element of the drive-shaft and the piston for imparting a compression movement thereto upon application of an accelerating force to the drive-shaft in either direction of rotation.

8. A drive-shaft for automobiles and the like having interposed therein an hydraulic buffer comprising a cylinder containing a cushioning liquid, a piston with sutable packing movable within the cylinder, a by-pass for the liquid having a restricted orifice operative on the compression movement of the piston and a free passage on the return movement thereof, a torque-transmitting connection between the piston and cylinder, a connection between one element of the drive-shaft and the piston for imparting a compression movement thereto upon application of an accelerating force to the drive-shaft in either direction of rotation, and means for imparting a return movement to the piston when the accelerating force is withdrawn.

9. A drive-shaft for automobiles and the like having interposed therein an hydraulic buffer comprising a cylinder containing a cushioning liquid, a piston with suitable packing movable within the cylinder, a by-pass for the liquid having a restricted orifice operative on the compression movement of the piston and a free passage on the return movement thereof, a torque-transmitting connection between the piston and cylinder, a connection between one element of the drive-shaft and the piston for imparting a compression movement thereto upon application of an accelerating force to the drive-shaft in either direction of rotation, and resilient means for limiting the compression movement of the piston and for imparting to it a return movement when the accelerating force is withdrawn.

10. A drive-shaft for automobiles and the like having interposed therein an hydraulic buffer comprising a cylinder containing a cushioning liquid, a piston with suitable packing movable within the cylinder, a by-pass for the liquid having a restricted orifice operative on the compression movement of the piston and a free passage on the return movement thereof, a torque-transmitting connection between the piston and cylinder, a connection between one element of the drive-shaft and the piston for imparting a compression movement thereto upon application of an accelerating force to the drive-shaft in either direction of rotation, and a compression spring between the cylinder head and piston.

11. A drive-shaft for automobiles and the like having interposed therein an hydraulic buffer comprising a cylinder containing a cushioning liquid, a piston with suitable packing movable within the cylinder, a by-pass for the liquid having a restricted orifice operative on the compression movement of the piston and a free passage on the return movement thereof, a torque-transmitting connection between the piston and cylinder, a compound screw connection between one element of the drive-shaft and the piston for imparting a compression movement thereto upon application of an accelerating force to the drive-shaft in either direction of rotation, and means for imparting a return movement to the piston when the accelerating force is withdrawn.

12. A drive-shaft for automobiles and the like having interposed therein an hydraulic buffer comprising a cylinder containing a cushioning liquid, a piston with suitable packing movable within the cylinder, a by-pass for the liquid having a restricted orifice operative on the compression movement of the piston and a free passage on the return movement thereof, a torque-transmitting connection between the piston and cylinder, a compound screw connection between one element of the drive-shaft and the piston for imparting a compression movement thereto upon application of an accelerating force to the drive-shaft in either direction of rotation, and resilient means for limiting the compression movement of the piston and for imparting to it a return movement when the accelerating force is withdrawn.

13. A drive-shaft for automombiles and the like having interposed therein an hydraulic buffer comprising a cylinder containing a cushioning liquid, a piston with suitable packing movable within the cylinder, a by-pass for the liquid having a restricted orifice operative on the compression movement of the piston and a free passage on the return movement thereof, a torque-transmitting connection between the piston and cylinder, a compound screw connection between one element of the drive-shaft and the piston for imparting a compression movement thereto upon application of an accelerating force to the drive-shaft in either direction of rotation, and a compression spring between the cylinder head and piston.

14. A drive-shaft for automobiles and the like having interposed therein an hydraulic buffer comprising a cylinder containing a cushioning liquid, a piston with suitable packing movable within the cylinder, a by-pass for the liquid having a restricted orifice operative on the compression movement of the piston and a free passage on the return movement thereof, a torque-transmitting connection between the piston and cylinder, a compound screw with a split engaging sleeve constituting a connection between one element of the drive-shaft and the piston for imparting a compression movement thereto upon application of an accelerating force to the drive-shaft in either direction of rotation, and means for imparting a return movement to the piston when the accelerating force is withdrawn.

15. A drive-shaft for automobiles and the like having interposed therein an hydraulic buffer comprising a cylinder containing a cushioning liquid, a piston with suitable packing movable within the cylinder, a by-pass for the liquid having a restricted orifice operative on the compression movement of the piston and a free passage on the return movement thereof, a torque-transmitting connection between the piston and cylinder, a compound screw with a split engaging sleeve constituting a connection between one element of the drive-shaft and the piston for imparting a compression movement thereto upon application of an accelerating force to the drive-shaft in either direction of rotation, and resilient means for limiting the compression movement of the piston and for imparting to it a return movement when the accelerating force is withdrawn.

16. A drive-shaft for automobiles and the like having interposed therein an hydraulic buffer comprising a cylinder containing a cushioning liquid, a piston with suitable packing movable within the cylinder, a by-pass for the liquid having a restricted orifice operative on the compression movement of the piston and a free passage on the return movement thereof, a torque-transmitting connection between the piston and cylinder, a compound screw with a split engaging sleeve constituting a connection between one element of the drive-shaft and the piston for imparting a compression movement thereto upon application of an accelerating force to the drive-shaft in either direction of rotation, and a compression spring between the cylinder head and piston.

17. A drive-shaft for automobiles and the like having interposed therein an hydraulic buffer comprising a cylinder containing a cushioning liquid, a closed cylinder head integral with said cylinder, a detachable cylinder head encircling one element of the shaft, packing arranged between said detachable head and the shaft, a piston within said cylinder, a by-pass for the liquid, a torque-transmitting connection between the piston and cylinder, and a connection between one element of the drive-shaft and the piston to impart a compression movement to the piston upon application of an accelerating force to the drive shaft.

18. A drive-shaft for automobiles and the like having interposed therein an hydraulic buffer comprising a cylinder containing cushioning liquid, a piston movable within said cylinder, said piston having a closed head and a smooth cylindrical surface engaging said cylinder, a by-pass for the liquid having a restricted orifice, a torque-transmitting connection between the piston and cylinder, and a connection between one element of the drive-shaft and the piston to impart a compression movement to the piston upon application of an accelerating force to the drive-shaft.

19. A drive-shaft for automobiles and the like having interposed therein an hydraulic buffer comprising a cylinder containing a cushioning liquid, a piston having a closed head and provided with internal screw threads, a member fixed to one element of the drive-shaft and having threads cooperating with the internal threads in said piston, a by-pass for the liquid having a restricted orifice, and a torque-transmitting connection between the piston and cylinder.

20. A drive-shaft for automobiles and the like having interposed therein an hydraulic buffer comprising a cylinder containing a cushioning liquid, and having a closed integral head, a piston movable within the cylinder, said piston having a closed head and internal screw threads, a member fixed to one element of said shaft and having screw threads thereon cooperating with the internal screw threads of said piston, said member being adapted to impart a compression movement to the piston upon application of an accelerating force to the drive shaft, a coil spring interposed between said piston and the closed head of said cylinder, and a torque-transmitting connection between the piston and cylinder, the pitch of the internal threads of said piston being such that the coil spring will return the piston to its initial position when the accelerating force applied to the drive shaft is removed.

In testimony whereof I affix my signature.

STEPHEN P. F. SNEED.